Figures 1, 2:
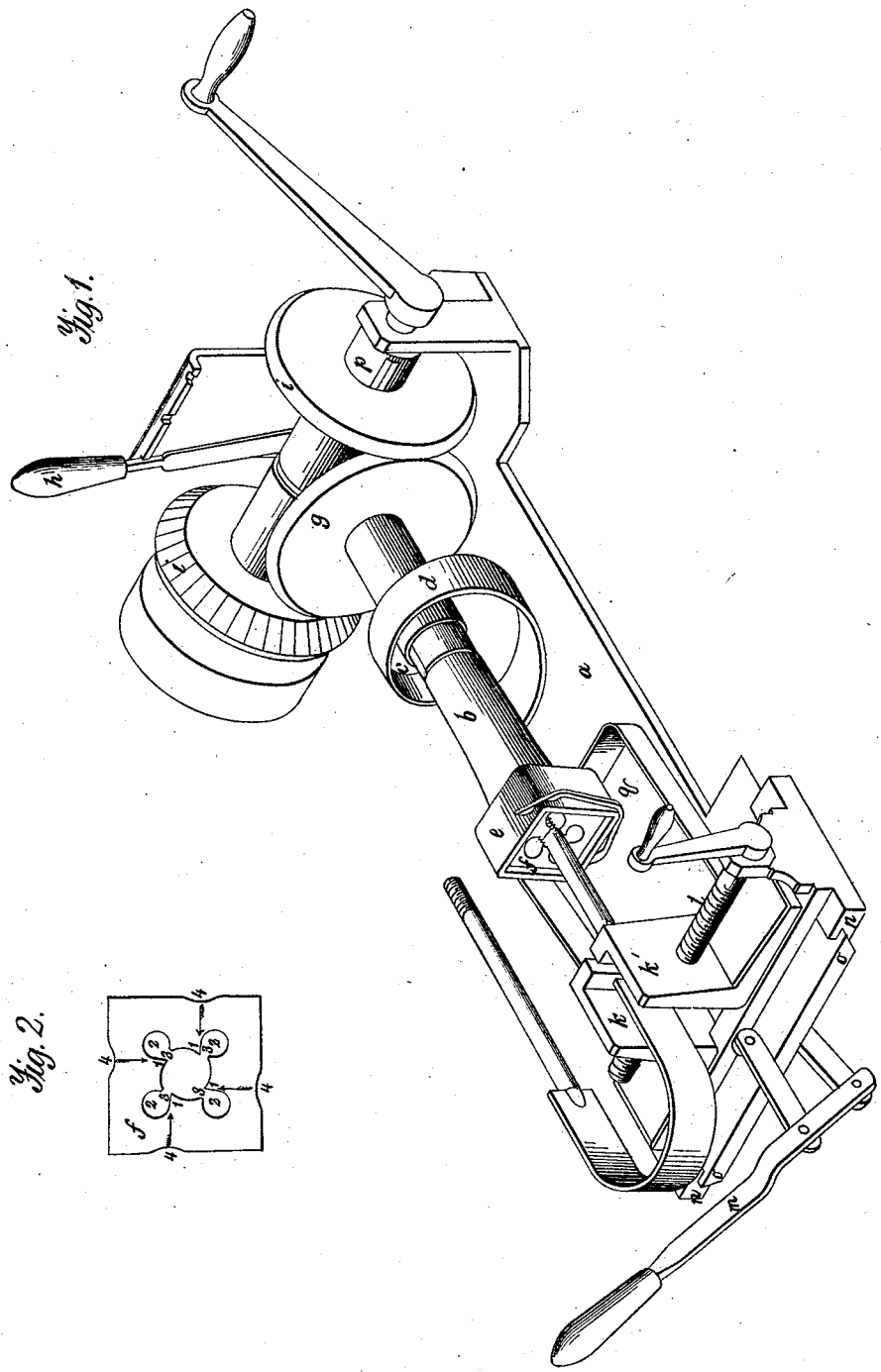

P. Hoffner,
Cutting Screws,
Nº 17,932.
Patented Aug. 4, 1857.

UNITED STATES PATENT OFFICE.

PETER HOFFNER, OF RISING SUN, INDIANA.

CUTTING SCREWS.

Specification of Letters Patent No. 17,932, dated August 4, 1857.

*To all whom it may concern:*

Be it known that I, PETER HOFFNER, of Rising Sun, Ohio county, Indiana, have invented new and useful Improvements in Screw-Cutting Machinery; and I hereby declare the following to be a full and exact description thereof, reference being had to the accompanying drawings, making part of this specification.

My invention relates chiefly to the combination of a spring with the die mandrel in such manner as to allow it an indefinite yielding play in any direction perpendicular to its axis of rotation, in order that it may be accommodated to any irregularities in the screw blank and restored to its original position when at rest, and also to an arrangement to facilitate the clamping and feeding of the blank.

In the accompanying drawings, Figure 1 is a perspective view of the machine and Fig. 2 is a face view of the die employed.

($a$) is a suitable base plate.

$b$, is a shaft which about its mid length has a neck or journal $c$, cut in its periphery.

$d$, is a very stout and stiff steel spring of volute form, attached at its butt end to the base plate and at its free end grasping, and forming the journal bearing for the neck of the shaft.

At one end the shaft $b$, is confined in a solid journal bearing and mounted with a bevel pinion $g$, actuated in either direction at will by means of cog wheels $i$, $i'$, which being attached to a sleeve on the crank or pulley shaft $p$, are either of them brought into gear with the pinion $g$, by means of a lever $h$, in customary manner.

$k$, $k'$, are two clamp jaws made to approach and recede at will by means of a right and left hand screw $l$. The clamp is confined to a rectilinear path by means of the guide clips $n$, $n'$, adapted to parallel ways $o$, $o'$, on the base plate and is fed forward by means of a lever $m$.

$q$, is a pan attached to the sliding clamp $k$ $l$ $n$, to receive the chippings which fall from the die.

The die shaft although held in precisely the right position for entering and threading a straight and true blank is at the same time capable of sufficient play to accommodate itself to one which is not so and allows the die to accommodate itself automatically to any slight sinuosities and irregularities which, though insufficient to detract materially from the practical utility of the bolt, frequently cause serious damage to the thread of the die and other parts of the machine where the die is entirely unyielding.

In the die employed by me the cutting points have a lead or inward salience imparted to them by means of the following mode of construction: To make a die which will thread a half inch bolt, I provide a blank whose aperture is $\frac{3}{8}$ to $\frac{7}{16}$ of an inch (according to the depth of thread required) and open it with a screw tap until the small side of the aperture is $\frac{9}{16}$ of an inch, then drill four chip holes 2, in the four corners and with a hack saw open passages 3, from the eye to the chip holes, then take a taper mandrel marked with a circle where it is half an inch in diameter and having brought the blank to a low red heat, with the pin of a hammer dent or "peen" the sides 4, of the die opposite the respective cutting points of the thread until the points of the smaller or finishing side of the eye just touch the circle on the mandrel, then very slightly and carefully tap the eye again just sufficiently to take off any wire edge or slight irregularities of "peening" and the die is finished, with the exception of annealing, fitting to the socket and tempering.

By the above means I make a solid die that is capable of threading with a leading or chisel cut, and consequently of working with only a small part of the labor of a common die. It will also thread with facility bolts of irregular thickness without danger of clogging and will readily reduce to a uniform size bolts of various diameters. Such a die will I believe outlast many of the customary kind, and after long wear may be easily restored to its original size and efficiency by "peening" or shrinking in the points and retouching with the tap in the manner already described. By means of a machine and die constructed by me on this plan I have easily threaded one hundred and fifty ⅜ bolts in an hour and after cutting upward of one thousand bolts have observed no perceptible decrease in the efficiency of the die.

I claim as new and of my invention herein—

In combination with the die-stock $b$, the volute or spiral spring $d$, arranged and operating substantially as, and for the purposes set forth.

In testimony of which invention I hereunto set my hand.

PETER HOFFNER.

Witnesses:
GEO. H. KNIGHT,
JAS. H. GRIDLEY.